UNITED STATES PATENT OFFICE.

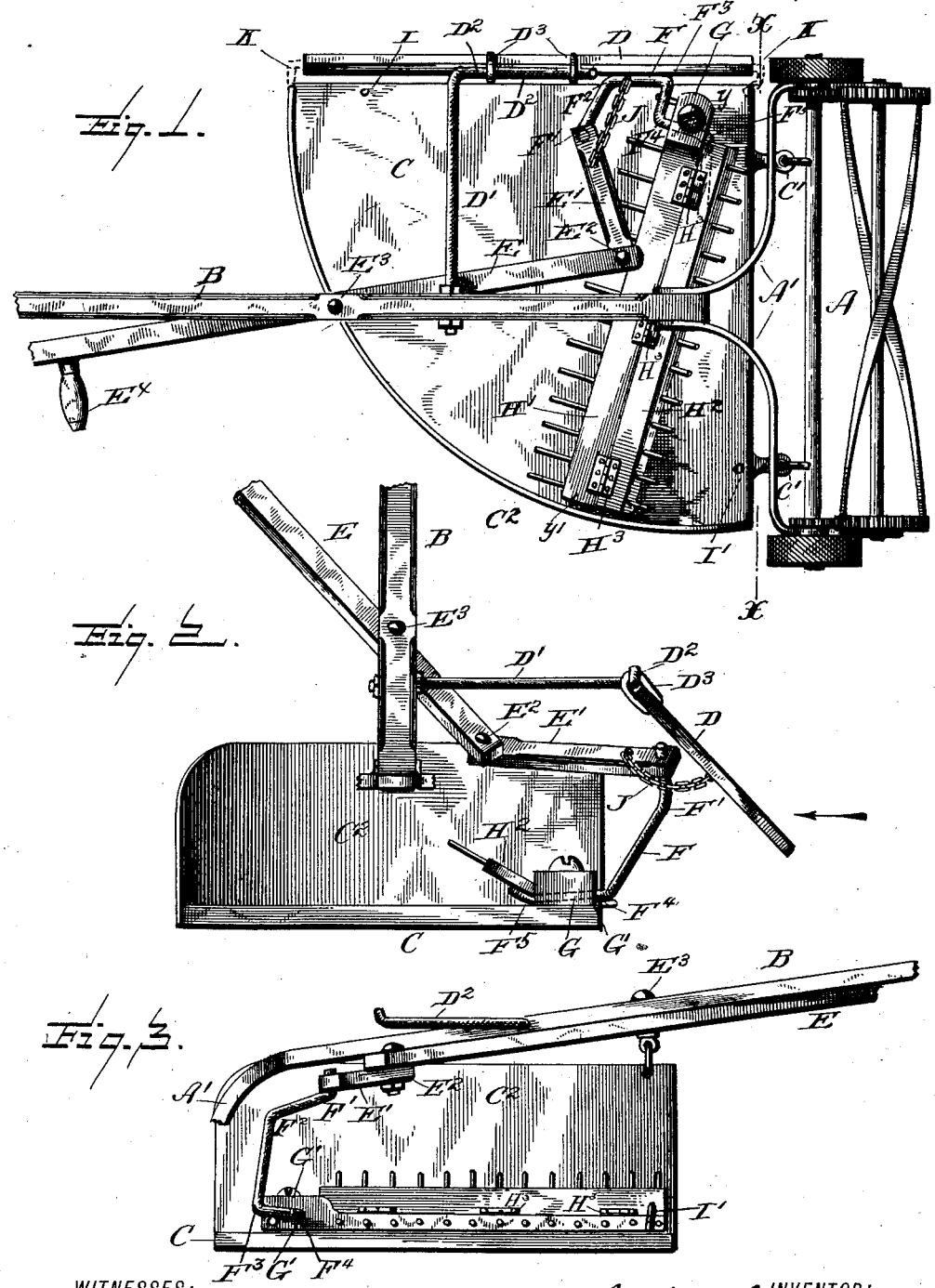

CHARLES F. HAMLIN, OF GRINNELL, IOWA.

RAKE ATTACHMENT FOR MOWERS.

SPECIFICATION forming part of Letters Patent No. 364,246, dated June 7, 1887.

Application filed April 16, 1886. Serial No. 199,058. (No model.)

*To all whom it may concern:*

Be it known that I, CHARLES F. HAMLIN, a citizen of the United States, residing at Grinnell, in the county of Poweshiek, State of Iowa, have invented certain new and useful Improvements in Rake Attachments for Mowers, of which the following is a specification, reference being had therein to the accompanying drawings.

This invention has relation to a device for gathering and delivering grass from mowers and reapers in convenient hills or rows, whereby its collecting may be facilitated; and the invention consists in certain features of construction, hereinafter specified, and particularly pointed out in the claims.

Although I have herein illustrated my invention as applied to an ordinary lawn-mower, I may apply the same to large-size reapers and mowers, by increasing the size and providing suitable mechanism for automatically operating and controlling the same.

Referring to the drawings, in which like letters of reference indicate like parts, Figure 1 is a top plan view of an ordinary lawn-mower provided with my improvement. Fig. 2 is a front elevation with the cutting mechanism removed. Fig. 3 is a side elevation with the cutting mechanism removed.

Referring more particularly to Fig. 1, A represents an ordinary lawn-mower provided with the usual driving and cutting mechanism, and with a tang, A', adapted to support an ordinary handle-bar, B.

Linked or otherwise flexibly connected to the mower A, as at C', is a platform, C, in this instance in the form of a quadrant, around the circular edge of which is secured a light guard, C². Bolted or otherwise secured to the handle B, and extending at a right angle thereto, is a bar or rod, D', which is bent at a right angle, forming an arm, D², from which depends, by means of links D³, a flap, D.

E E' represent a toggle-lever, pivoted, as at E², and pivotally connected to the handle B, as at E³, the free end of said lever being provided with a suitable operating-handle, E⁴.

Pivoted in the lower end of the toggle-lever E', as at F', is a crank arm or lever, F, bent to form the angles F² F³ F⁴, after which it is passed through a bearing-block, G, perforated therefor at G', and is then bent to form a rock-arm, F⁵. (See dotted lines, Fig. 1, and full lines, Fig. 2.) This arm is adapted to operate the platform-clearing device, hereinafter described. The bearing-block G is secured to or may be made as a part of the raking mechanism, which consists of two parallel bars, H' H², loosely connected by hinges H³, and provided with ordinary rake-teeth at their free ends. The rake-bar H' is movable horizontally upon the platform, and, by reason of the peculiar formation of the crank-lever F, by which it is actuated, is caused to swing from front to rear of said platform, its pivoted end y traveling in a smaller arc than does its free end y'. The companion bar H², of course, as it is connected to the bar H, travels with it, and in addition to its consequential oscillatory movement is caused, by the rock-arm when it reaches a certain point, to lift, as shown in Figs. 1 and 2. These movements of the raking and clearing bars are, it is evident, caused by operating the bar or lever E.

The dotted lines K, Fig. 1, indicate a simple method of suspending the flap D from the platform C, instead of from the handle B of the mower, which method may be adopted, if desired.

It is evident that I may, if desirable, mount the platform or grass-receptacle upon suitable rollers or suspend it from the handle B.

The mower moving along over the grass, the cutting mechanism being in the lead, it will be seen that the grass as it is cut will be caught upon the platform C, the rake being in position at and parallel with the front end thereof, and the flap D hanging vertically, thus forming a closed receptacle for the grass. When a sufficient quantity of grass has been collected, or when the mower has arrived at a point where it is desired to dump said grass, the operator, by throwing the toggle-lever E, by means of the handle E⁴, out away from the handle B, causes the crank-rod F to be forced outwardly, moving bodily around the pivot of and with the rake-bar H', and at the same time, by reason of its peculiar bends, in the bearing-block G, which causes the rock-arm F³ to lift or rise and the clearing device H² to lift or rise and gradually assume a substantially upright position to the rake-bar H' and the platform C. The same motion of the lever E, at the same time that the clearing device H² is elevated, (the crank-rod F having a bearing in the block G,) causes the rake to swing bodily from the front to the side portion of the platform, the outer end of the rake coming close to the guard C², and the grass collected in the apron or receptacle is packed by reason of the rake portion H², and carried to the side. By the time it arrives at the side the bent portion F of the arm strikes against and causes the flap D to swing outwardly away from the platform, whereupon the grass is forced over the side of said platform, the rake being checked in its outward movement by means of stop lugs or pins I I'. By swinging the handle E back to a parallel position with regard to the handle B, the rake is carried back to the front of the platform, the portion of clearing device H² dropping down, and the flap D assumes a vertical position by gravity; or, if desired, by means of a chain, J, secured to the flap and the lever F'. By the means just described the grass may be cut and collected and dropped at intervals or at the ends of rows and thereafter easily collected.

Having described my invention and its operation, what I claim, and desire to secure by Letters Patent, is—

1. In a lawn-mower, a loosely-connected platform, in combination with a swinging flap suspended at one side thereof and adapted to be opened and closed by the rake-operating mechanism, substantially as specified.

2. In a lawn-mower, a quadrant-shaped platform connected to said mower and provided with a guard at the circular edge thereof, in combination with a flap suspended at one side thereof and adapted to be operated by the rake-operating mechanism, substantially as specified.

3. The combination, with the platform of a lawn-mower and a rake consisting of two parts toothed and hinged together, mounted thereon, of a lever connected to said rake by means of a crank-rod bent to form a rock-arm, whereby the oscillation of said lever will cause said crank-arm to swing the rake bodily and said rock-arm to raise one of the members of said rake to a substantially vertical position, substantially as specified.

4. The combination, with the platform of a lawn-mower provided with a swinging flap at one side and having raking devices mounted thereon, of a crank-rod one end of which is connected with the rake and the other to a lever pivoted on the mower-handle, said crank-rod being bent as at $F^2$ $F^3$ $F^4$ $F^5$, whereby the oscillation thereof by the lever will cause the rake to move bodily over the surface of the platform and at the same time raise or swing outwardly a flap, whereby grass may be delivered over the side of said platform, substantially as specified.

5. The combination, with the handle B, and lever E E', pivoted thereto, of the crank-rod F, bent as at F' $F^2$ $F^3$, the rake comprising the rake-bar H' and clearing-bar H², hinged, as at H³, and the platform C, substantially as specified.

6. The combination, with the handle B, lever E E', and crank-rod F, bent as at F', and connected with the rake H', mounted on the platform C, of the rod D', having the arm D² and connected to said handle and to the swinging flap B, hinged thereto, substantially as specified.

7. In combination with the platform C, the rake comprising the hinged bars H' H² and bearing-block G, the crank-rod F, bent as at F' $F^2$ $F^3$, and the toggle-lever E E', pivoted to the handle B, substantially as specified.

In testimony whereof I affix my signature in presence of two witnesses.

CHARLES F. HAMLIN.

Witnesses:
D. L. TAYLOR,
GEO. H. HAMLIN.